May 8, 1934.  G. ROTTMAN  1,957,980
RECEPTACLE
Filed Oct. 1, 1932     3 Sheets-Sheet 1
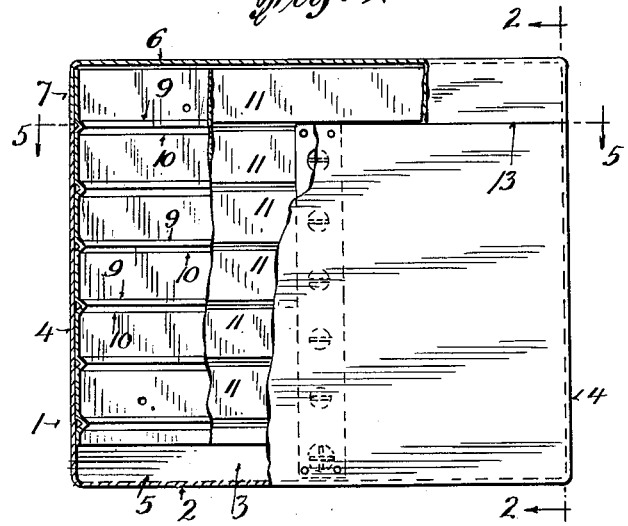
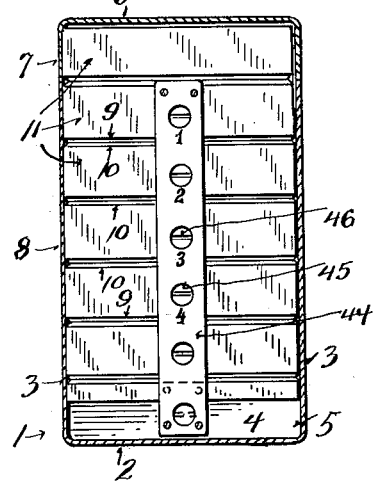
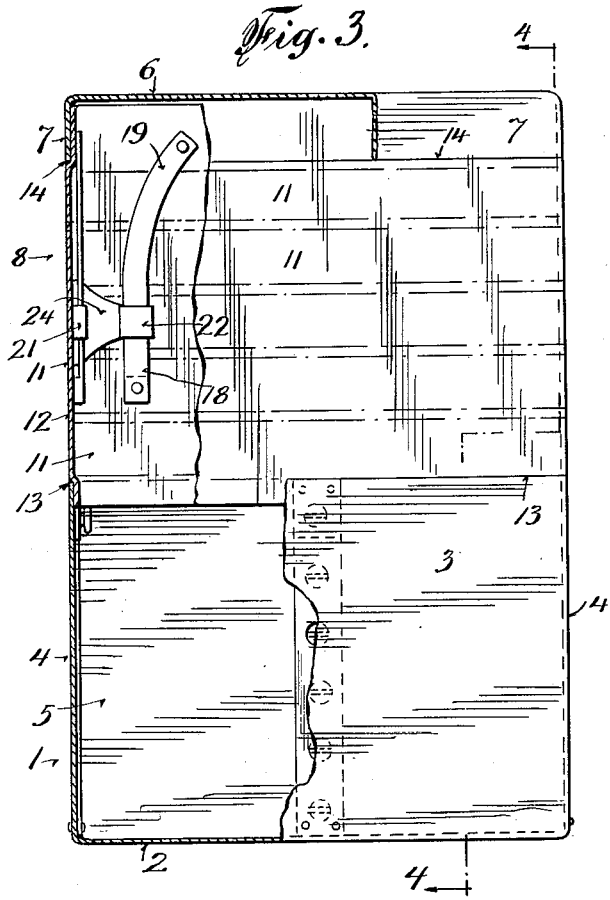
INVENTOR
George Rottman
BY Charles G. Hensley
ATTORNEY May 8, 1934. G ROTTMAN 1,957,980
RECEPTACLE
Filed Oct. 1, 1932 3 Sheets-Sheet 2
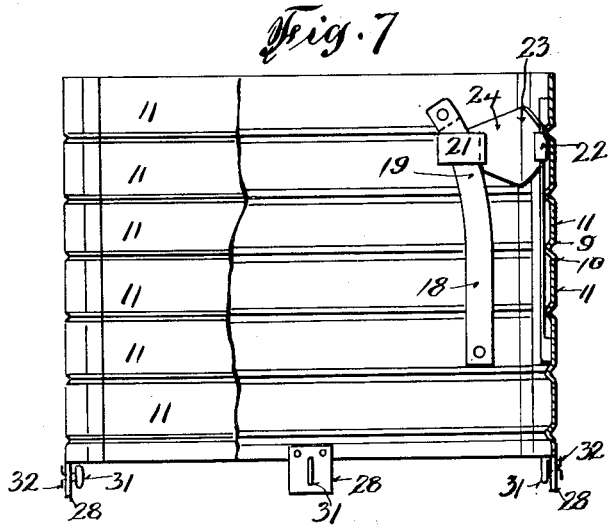

May 8, 1934.   G. ROTTMAN   1,957,980
RECEPTACLE
Filed Oct. 1, 1932    3 Sheets-Sheet 3
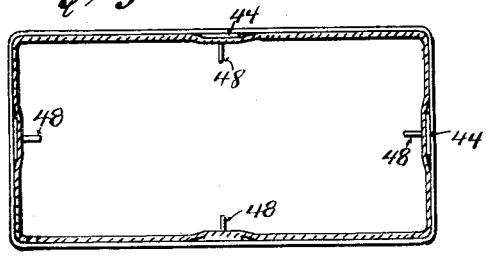
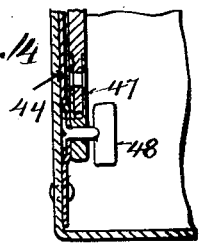
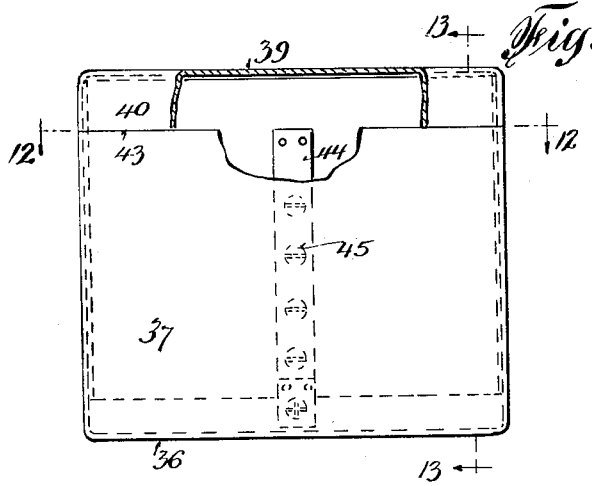
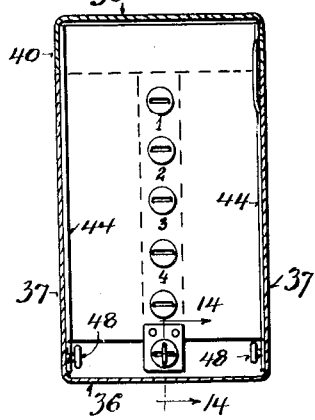
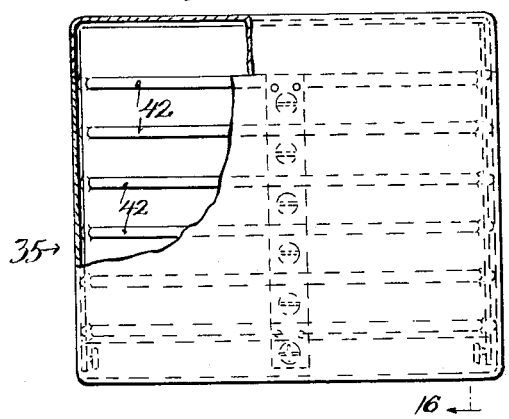
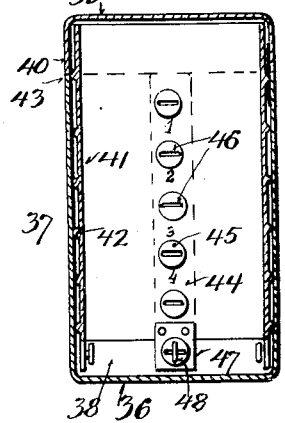
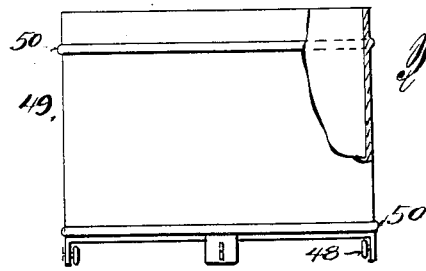
INVENTOR
George Rottman
BY
Charles G. Hensley
ATTORNEY Patented May 8, 1934

1,957,980

UNITED STATES PATENT OFFICE 1,957,980

RECEPTACLE

George Rottman, New York, N. Y.

Application October 1, 1932, Serial No. 635,721

15 Claims. (Cl. 229—6)

My invention relates to receptacles and more particularly to receptacles which may be adjusted or extended to increase or decrease the capacity of the receptacle by altering its dimensions in at least one direction. The receptacle is preferably made from sheet material such as cardboard or fibre board, and it may be used for various purposes such as carrying cases, valises or it may be merely used as a storage receptacle for garments and other things which it is desired to protect against moths, dampness and dust.

Another object of the invention is to provide a receptacle which may be adjusted in capacity, as stated above, and which will in its various positions of adjustment have a protecting closure which will prevent moths entering the receptacle and also protect the contents from dust and moisture as well as light. Other features and advantages will be set forth in the following detailed description of my invention.

In the drawings forming part of this application,

Figure 1 is an elevation of a receptacle embodying one form of my invention and in this view parts are broken away to show the interior, Figure 2 is a sectional view taken on the line 2—2 of Figure 1, Figure 3 is an elevation of a receptacle containing my improvements, parts being broken away and showing the receptacle in the extended position for holding the maximum volume, Figure 4 is a sectional view taken on the line 4—4 of Figure 3, Figure 5 is a sectional view taken on the line 5—5 of Figure 1, showing the corner pieces tightened in one end of the receptacle, and loose in the other end, Figure 6 is a plan view of a portion of the inner section of the receptacle, showing the corner expanding device, Figure 7 is an elevation with parts broken away and showing the inner member of the receptacle removed from the outer member, Figure 8 is a plan view of the inner member removed, and showing how the corners are bendable, Figure 9 shows in perspective parts broken away on the line 9—9 of Figure 3, Figure 10 is a perspective view of the corner spreading device for the inner member of the receptacle, Figure 11 is an elevation of a receptacle containing my invention in a modified form, Figure 12 is a sectional view taken on the line 12—12 of Figure 11, Figure 13 is a sectional view taken on the line 13—13 of Figure 11, Figure 14 is an enlarged sectional view taken on the line 14—14 of Figure 13, Figure 15 is an elevation with parts broken away and showing my invention in a modified form, Figure 16 is a sectional view taken on the line 16—16 of Figure 15, and Figure 17 is an elevation with parts broken away, of an inner section similar to that shown in Figures 15 and 16 but having fewer ribs or beads surrounding the same.

I will first describe the form of my invention shown in Figures 1 to 10 inclusive.

In this form of the invention there is a receptacle consisting of a member 1 which includes a bottom wall 2, side walls 3, and end walls 4 forming, preferably, a rectangular compartment 5 for the reception of any articles to be stored or carried in the receptacle. This section of the receptacle, as well as the others to be described, may be made of cardboard, corrugated board, or any other suitable material. At the upper end or top of the receptacle there is a cover 6 for closing the top of the receptacle. This cover has a top, together with a depending flange 7 extending around four sides thereof. In addition to the bottom member and the cover there is a telescoping section 8 which is adapted to slide vertically within the lower member 1 of the receptacle and to be locked in various positions of adjustment in order to form a compartment which is an extension of or a continuation of the compartment 5. This upper compartment extension will be of various depths and therefore have different capacities, according to the extent that this inner member is projected above the lower section 1 of the receptacle. In other words, the section 8 forms a continuation of the lower section of the receptacle in relation to which it is adapted to telescope and its position may be adjusted to vary the depth of the receptacle as a whole, according to the volume of the articles to be stored or carried in the receptacle. It forms an enclosure extending between the lower receptacle member 1 and the cover, and it is adapted to form a very close or air-tight and moth-proof connection with both the lower receptacle member and the cover.

In the form of the invention shown in Figures 1 to 4, this inner member comprises four rectangular walls which may be made of cardboard, pressed board, or any other suitable material; and this inner member is scored or creased along the lines 9, 10 so that between each set of crease lines there are individual and parallel sections 11, preferably all of the same width.

These sections are connected by the narrow portions containing the several crease lines 9, 10 and the crease lines form small bellows-like connections between the sections 11, the bellows portions extending inwardly of the inner receptacle member is shown in Figure 1 when this section is completely lowered into the lower section 1. When, however, the inner member of the receptacle is raised or extended partly above the top of the lower section, as shown in Figures 3 and 4, the walls of the inner member are adapted to be straightened out or slightly expanded as permitted by the narrow bellows connections, so that the inner member presents straight wall portions 12 between the top of the lower section 1 and the bottom edge of the flange of the cover, as shown in Figure 3.

One of the sections 11 of the inner member in Figure 3 is shown as lying within and close to the inner side of the top edge of the lower receptacle. Adjacent or registering with the top edge 13 of the lower section, one of the bellows sections created by the crease lines 9, 10 extends laterally against the top edge 13 of the lower section 1 to form a snug joint which will exclude moths, moisture and dirt from passing into the receptacle through the joint formed between the outer and inner sections. Likewise, one of the bellows portions of the inner member registers with the lower edge 14 of the flange of the cover, so that this bellows portion extends across the edge of the cover to form a snug fitting joint to prevent moths, moisture or dirt from entering the receptacle between the cover and the inner receptacle member. If the portions of the inner member between the top and bottom sections 11 in Figure 3 are pressed outwardly in the manner hereinafter described, then the outer surface of the inner receptacle member will lie flush with the outer surface of the cover and with the outer surface of the lower section 1 of the receptacle.

The inner member 8 consisting of the four walls each formed of the parallel sections 11 between the several bellows portions is soft or bendable at the corners, as shown at 15 and this permits the several side walls to be slightly compressed when the inner section is fitted into the lower section and it permits the portion of the inner section which lies between the edge of the cover and the top edge of the lower section to be slightly expanded in the manner above described. In order to expand the inner member between the cover and the top of the lower section, I provide devices adjacent the four corners of the inner member as shown in detail in Figure 10 as well as being shown in Figures 3, 5, 6 and 7.

Adjacent each corner of the inner member of the receptacle there are guides or tracks 16 each having a spacing block 17 on each end and these blocks are stapled or riveted to the uppermost section 11 of the inner member and to one of the lower sections thereof. There is one of these guide rails or tracks at each side of each corner of the inner member, as shown in Figure 6. These members have lower portions 18 which are relatively nearer the corner of the inner member; and the upper portions 19 of these guide rails diverge or turn away from the adjacent corner of the member 8 as shown in Figure 3 and as shown in Figure 10. It will be apparent that the two guide rails on opposite sides of the same corner of the inner member of the receptacle will diverge from each other at the top and converge and become parallel at their lower ends.

There is a sliding strap 20, preferably made of sheet metal and this strap has a loop 21 surrounding one of the rails 16 and a loop 22 surrounding the guide rail on the opposite side of the same corner of the receptacle; and between the two looped ends the strap is curved at 23 so that the two arms 24 of the strap lie at right angles to each other.

When the inner receptacle member is being adjusted up or down in relation to the outer member the several straps 20 are slid upwardly on the rails 16 so that they engage the divergent portions 19 of the rails which causes the corner portion 23 of the strap to be drawn inwardly in relation to the corners of the inner member, as shown at the right hand portion of Figure 5. This also releases the outward pressure on the inner receptacle member so that it may be raised or lowered in relation to the lower member. After the inner member has been raised to bring any number of the sections 11 above the top of the outer receptacle member, the parts may be brought into the condition shown in Figure 3 by sliding the straps 20 downwardly on the rails. This will cause the corner portions 23 of the straps to be forced outwardly as the straps move down to the lower portions 18 of the rails and this causes the corner portions of the straps to press outwardly against the several corners of the inner receptacle member. It also causes the straps to press outwardly against the sections 11 so that the portions of the inner receptacle member lying between the lower edge of the cover and the top edge of the outer section will be forced slightly outwardly in order that the inner section will lie flush with the outer section and with the flange of the cover. In other words, it causes the adjacent bellows portions to lie across the edges of the cover and the top edge of the lower receptacle member as is clearly shown in Figure 3. The sliding straps and the rails, therefore, co-operate to release the tension or pressure against the inner member when the latter is being adjusted in position and they may be operated to create the necessary outward pressure on the inner member 8 to bring the parts into the condition shown in Figure 3.

I have provided means for locking the receptacle sections in their various positions of adjustment and it consists of the following:

There is a metal strip 25 disposed vertically inside the wall of the lower receptacle member 1 and preferably there is such a strip attached to the middle of each of the four walls of the inner section. This strip is provided with indentations 26 corresponding in number and spacing with the number of sections 11 of the inner receptacle section. In each of these depressions there is a key slot 27. In addition I have provided the metal clamp 28 straddling the lower edge of the inner receptacle section 8 and attached thereto by rivets, and this member has an aperture 29 through which the stem 30 of a key projects from the inner side of the receptacle. This key has a handle portion or wing 31 lying within the receptacle so that it may be operated by inserting the hand within the latter. The shank 30 of the key extends through the aperture 29 and on its outer end it is provided with the locking wings 32 which are adapted to pass through any of the slots 27 of the strip 25 when registering therewith.

While the inner receptacle member is being adjusted vertically, the wings 32 of the key are withdrawn from the strip 25 to allow the inner receptacle member to be moved up or down. When the inner receptacle has been adjusted to the desired position, that is, so that it projects above the lower sections, any one of the unit positions corresponding with the several sections 11, the locking key will be brought to register with one of the slots 27 in the strip 25. The key is turned until the wings 32 register with a slot 27, whereupon the wings 32 pass through the plate 25 and the key is then turned half a turn to bring the wings crosswise of the slots.

This will be done with each key and if the receptacle is equipped in accordance with the showing in the drawings there will be four such keys, each to be operated from the interior of the receptacle to lock one of the four vertical walls of the inner and outer receptacle members together. The keys will remain in their locked position as long as the receptacle is to be used in the condition in which it has been placed. If at any time it is desired to enlarge or decrease the capacity of the receptacle, the several keys will be turned until the wings 32 register with the slots 27, whereupon the keys may be drawn inwardly to disengage from the strips 25; the inner receptacle member may then be adjusted and the keys are reinserted in whatever slots 27 of the strips 25 register with the keys in the new adjusted position of the inner receptacle member.

From the above it will be observed that I have provided means for spreading the inner receptacle member between the top of the outer member of the receptacle and the bottom of the cover to form a tight closure between the several members of the receptacle and in order to make the inner section lie flush with the outer surfaces of the lower member and the cover. It will also be apparent that I have provided means for locking the inner and outer sections when placed in various positions of adjustment.

In Figures 11 to 14 I have shown the telescoping features with the locking device used in conjunction with a plain telescoping receptacle.

In Figures 15 and 16 I have shown a modified form of telescoping receptacle. In this form there is an outer member 35 consisting of a bottom wall 36, side and end walls 37, 38. There is also a cover 39 consisting of the top wall and the depending flange 40 which is adapted to lie flush with the vertical walls of the member 35. There is an inner member adapted to telescope within the lower member 35 and it consists of a shell having the four walls 41 disposed in rectangular shape. This shell is provided with beads 42 extending horizontally around the several walls of the inner member and these beads may be formed by embossing or creasing the sheet material of which the inner member is formed. The proportions of the inner member are such that when the inner member is fully inserted into the outer member, as shown in Figure 16, the walls of the inner member are slightly pressed inwardly or compressed under tension. When the parts are in the position shown in Figures 15 and 16 the inner member is lowered into the outer member and the cover fits over the inner member and lies flush with the outer member of the receptacle. If it is desired to increase the depth of the receptacle, the cover is removed and the inner member is lifted so that any one of the horizontal beads 42 comes just above the top edge of the outer member 35. Due to the fact that the tension on the inner member is released where the former extends above the outer member, the inner member will expand slightly, so that one of the beads will project over the top edge 43 of the outer member and form a tight closure against this edge. The inner member may be adjusted to bring any of the horizontal beads to register with the top edge of the outer member, according to the desired increase in capacity of the receptacle. In this construction I have shown a device for locking the sections in various adjusted positions similar to that shown in Figures 1 to 4.

The metal strips 44 are attached to the inner sides of the vertical walls of the outer receptacle member 35 and they are provided with the depressions 45 and with the slots 46 arranged at different unit positions along the strip. On the lower end of the inner receptacle member there are attached plates 47 each having a key 48 adapted to engage in the slots 46 in the same manner as the corresponding parts in Figures 1 to 4. Preferably, there is a strip 46 attached to the middle of each vertical wall of the outer member of the receptacle and there is a key plate 47 attached to each of the four walls of the inner receptacle member, so that the locking device will lock all four sides of the receptacle members together.

It will be understood that the key 48 will register with the different slots 46 in positions corresponding with the registering of the horizontal beads 42 against the top edge of the outer receptacle member.

In Figure 17 I have shown an inner receptacle member 49 corresponding in every way with the one shown in Figures 15 and 16 except that there are only two horizontal beads 50 arranged on the inner receptacle. This allows for only two adjustments in the capacity of the receptacle. In other respects the device will operate the same as the device in Figures 15 and 16. It will be understood that the inner member shown in Figure 17 will be inserted in an outer member corresponding with the one shown in Figures 15 and 16.

From the above it will be apparent that I have provided a telescoping receptacle which is adapted to be adjusted to alter its capacity and that I have provided means for locking the inner and outer receptacle members in their various positions of adjustment.

It will be apparent also that I have provided a receptacle having a joint or connection between the inner member and the upper edge of the outer member which will exclude moths, air and dust from entering the receptacle, and that this condition may be obtained in various telescoping relationships of the inner and outer members.

Having described my invention, what I claim is:

1. A receptacle including a body composed of sections adapted to telescope to permit the adjustment of the capacity of the receptacle, and means for securing said sections in various positions of adjustment including a plate carried by one of said body members, and having elongated slots therein and a key having a wing of elongated cross section carried by the other of said body members and adapted to be passed through the slots in said plate when aligned therewith and to be turned crosswise of said slots to lock the body members in different positions of adjustment.

2. A receptacle comprising body sections adapted to be telescoped in relation to each other to adjust the capacity of the receptacle, and means for locking said sections in different positions of adjustment, including a strip carried by one of said body members and having depressions therein, and elongated slots in the depressed portions of the strip, and means connected with the other of said body members, including a key operable from the inside of the receptacle body and having a wing of elongated cross section insertable through said slots and adapted to be turned in crosswise thereof to lock said body members in different positions of adjustment.

3. A receptacle including an outer body member, an inner body member adapted to telescope within said outer body member for the purpose of adjusting the capacity of the receptacle, and a cover for said latter body member, said inner body member having horizontal crease lines around the same to form flexible portions and relatively stiff panels between said flexible portions, said flexible portions permitting the panel portions to expand between the top edge of the outer body member and the flange of the cover.

4. A receptacle including an outer body member, an inner body member adapted to telescope within said outer body member for the purpose of adjusting the capacity of the receptacle, and a cover for said latter body member, said inner body member having horizontal, parallel and adjacent crease lines around the same to form flexible portions and relatively stiff panels between said flexible portions, said flexible portions permitting the panel portions to expand between the top edge of the outer body member and the flange of the cover, and said flexible portions being adapted to abut against the top edge of the outer body member and the flange of the cover when said panel portions are expanded.

5. A receptacle including an outer body member, an inner body member adapted to telescope within said outer body member for the purpose of adjusting the capacity of the receptacle, and a cover for said receptacle, said inner body member having horizontal crease lines along its sides to form flexible portions, and relatively stiff panels between said flexible portions, said flexible portions permitting the panel portions to expand between the top edge of the outer body member and the flange of the cover whereby the outer surface of said inner body member may lie flush with the outer surface of the outer body member and the outer surface of the flange of the cover.

6. A receptacle including an outer body member, an inner body member adapted to telescope within said outer body member for the purpose of adjusting the capacity of the receptacle, a cover for said inner body member, said inner body member having horizontal crease lines to form flexible portions on the side walls thereof and relatively stiff panels between said flexible portions, said flexible portions permitting the panel portions to expand between the top edge of the outer body and the flange of the cover, and means for locking said body members in different positions of adjustment to prevent collapse thereof.

7. A receptacle including an outer body member, an inner body member adapted to telescope within said outer body member for the purpose of adjusting the capacity of the receptacle, a cover for said inner body member, said inner body member having horizontal crease lines to form flexible portions on the side walls thereof and relatively stiff panels between said flexible portions, said flexible portions permitting the panel portions to expand between the top edge of the outer body and the flange of the cover, means for locking said body members in different positions of adjustment to prevent collapse thereof, said locking means including a strip carried by the outer body member and having slots thereon at different positions along its length, a member attached to the lower portion of said inner body member, and a key carried by said latter member and co-operating with said slots to lock the body members in different relative positions.

8. A receptacle including an outer body member, an inner body member adapted to telescope in relation thereto, a cover for said latter body member, said inner body member being adapted to be expanded between the top of the body member and the flange of the cover, and means for applying expanding pressure to said inner body member including guide members attached to different side walls of said inner body member adjacent the corners thereof, said guide members having divergent portions, and a sliding member co-operating with said guiding members to apply expanding pressure to the walls of said inner body member.

9. A receptacle including an outer body member, an inner body member adapted to telescope in relation thereto, a cover for said latter body member, said inner body member being adapted to be expanded between the top and body member and the flange of the cover, and means for applying expanding pressure to said inner body member, including guide rails attached to different side walls of said inner body member adjacent the corners thereof, said guide rails having portions parallel to each other and portions divergent in relation to each other, and a sliding member co-operating with said guiding rails adapted to apply expanding pressure to the walls of said inner body member in one position on said guide rails and to release said pressure when moved to another position on said guide rails.

10. A receptacle including a body member having walls meeting at an angle, and means for applying outward pressure against said walls adjacent the corners, including guide members attached to different walls of said body member adjacent the corner, a slidable member co-operating with said guide members and adapted, when moved in one direction, to apply outward pressure to said walls and when moved in the other direction to release said pressure, said sliding member having an angular portion adapted to press outwardly on the corner of said body member.

11. A receptacle including a body member having walls meeting at an angle to each other, means for applying outward pressure to said walls adjacent the corners, including guide bars attached to the inside of the walls of said body on opposite sides of a corner thereof, a strip having loops surrounding and engaging said guide bars whereby the strip is movable along the latter, said guide bars having relatively divergent portions and relatively parallel straight portions, said strap having an angular portion adapted to press against the inner corner of the receptacle body.

12. A receptacle composed of body members adapted to telescope in relation to each other and to be adjusted to regulate the capacity of the receptacle, including an outer body section, an inner body section, said sections telescoping in relation to each other, a cover therefor, said inner body section having horizontal rib-like projections around the sides thereof, said rib-like projections engaging against the edge of the open end of the outer body section to form a close joint between the inner and outer body sections.

13. A receptacle including an outer body member, an inner body member telescoping within the outer body member and adjustable to vary the capacity of the receptacle, a cover for said receptacle, said inner body member having horizontal projecting ribs around the sides thereof, said ribs, when the body is extended engaging respectively against the edge of the cover and against the edge of the open end of the outer body member to form a close joint between said several members of the receptacle.

14. A receptacle including an outer body member, an inner body member having soft corners, said inner body member having outer ribs on the outer portions of the side walls thereof terminating short of the soft corners, said inner body member being adapted to be slightly compressed where it is received in said outer body member, a cover for the receptacle, said outer ribs on the inner body member being adapted to abut against the edge of the flange of the cover and the upper edge of the open end of the outer body member when the receptacle is in the extended position.

15. A receptacle including an outer body member, an inner body member having soft corners, said inner body member having outer ribs on the outer portions of the side walls thereof terminating short of the soft corners, said inner body member being adapted to be slightly compressed where it is received in said outer body member, a cover for the receptacle, said outer ribs on the inner body member being adapted to abut against the edge of the flange of the cover and the upper edge of the open end of the outer body member when the receptacle is in the extended position, and means for locking said body member in various adjusted positions to retain said body members in various adjusted positions.

GEORGE ROTTMAN.